United States Patent [19]

Hyler et al.

[11] 4,063,361
[45] Dec. 20, 1977

[54] POWER TRAIN FOR TWO-WHEEL TRACTOR

[75] Inventors: John H. Hyler; Edward G. Orth, both of Peoria, Ill.

[73] Assignee: Westinghouse Air Brake Company, Pittsburgh, Pa.

[21] Appl. No.: 756,128

[22] Filed: Jan. 3, 1977

[51] Int. Cl.$^2$ .................. E02F 3/64; B60G 11/26
[52] U.S. Cl. .................. 37/129; 180/70 R; 280/65; 280/112 A
[58] Field of Search .................. 37/124 R, 126 R, 129, 37/8; 280/63, 65, 80 R, 109–112 R, 117, 118, 681, 688, 125, 126, 112 A, 113; 180/58, 59, 61, 70 R, 85

[56] References Cited

U.S. PATENT DOCUMENTS

| | | | |
|---|---|---|---|
| 2,973,049 | 2/1961 | Kolinger et al. | 180/70 R |
| 3,065,811 | 11/1962 | Parrett | 180/70 R |
| 3,118,686 | 1/1964 | McAdams | 280/65 |
| 3,150,737 | 9/1964 | Kozicki | 180/70 R |
| 3,524,513 | 8/1970 | Williams | 37/129 X |
| 3,549,168 | 12/1970 | Swanson | 37/124 X |
| 3,584,405 | 6/1971 | Mazzarins | 37/129 X |
| 3,679,017 | 7/1972 | Roe | 280/112 A |
| 3,845,833 | 11/1974 | Bice | 280/65 X |

Primary Examiner—E. H. Eickholt

Attorney, Agent, or Firm—Leydig, Voit, Osann, Mayer & Holt, Ltd.

[57] ABSTRACT

An off-highway vehicle having a tractor section and a trailing section each having a pair of ground engaging wheels. The tractor section has an axle assembly with aligned front and rear pivot connections defining a roll axis, with a spring suspension device being interposed between the rear pivot connection and the tractor section to accommodate relative movement. The tractor section has an engine mounted at the rear and a transmission at the front, with a main drive shaft extending from the transmission to the axle and having universal joints at its ends. The forward pivot connection of the axle assembly is positioned substantially midway of the universal joints for equal angular deflection at the joints upon a given amount of relative vertical movement of the tractor axle. In the preferred embodiment the trailing section has an axle assembly including a pair of laterally spaced forwardly projecting tongues providing rigidity about a fore-and-aft roll axis, rolling rigidity also being provided between the two sections of the vehicle, so that the tractor section tilts in accordance with lateral tilt of the wheels of the trailing section, while the tractor axle assembly is free to undergo relative movement about its roll axis in the following of ground contours.

10 Claims, 17 Drawing Figures

Fig. 13b.
STRIKING BUMP

Fig. 13c.
STRIKING HOLE

POWER TRAIN FOR TWO-WHEEL TRACTOR

BACKGROUND OF THE INVENTION

The invention relates generally to an off-highway vehicle and more specifically to an earth moving machine having a tractor section and a trailing section, with the tractor section having an axle assembly which is coupled to a transmission located at its front end and which has provision for relative vertical movement.

In Swanson U.S. Pat. No. 3,865,205 there is disclosed a tractor section having an engine at the rear and a transmission at the front with the transmission being coupled to the axle assembly by means of a drive shaft having a universal joint at its front end. The universal joint is transversely aligned with the axle assembly pivot connection so that as the wheels of the tractor section move upwardly and downwardly on irregular terrain the universal joint is rocked off center to an equal angular degree.

Moreover in the construction of the prior patent the tractor axle assembly has rolling rigidity with respect to the tractor section so that the tractor section and the driver who is seated thereon are subject to violent lateral swaying movement as the tractor wheels tilt from side to side in the following of irregular terrain. Where the tractor section has rolling rigidity with respect to the trailing section which, in turn, has rolling rigidity with respect to its supporting wheels, it is possible, on irregular terrain, for one of the tractor wheels to lose traction with respect to the ground.

SUMMARY OF THE INVENTION

It is, accordingly, an object of the present invention to provide an off-highway vehicle of the type in which the tractor has an engine at the rear and a transmission at the front, in which the axle assembly which supports the tractor wheels is free to move, with respect to the tractor, both in the vertical direction and about a roll axis so that the angular position of the tractor is unaffected by the variations in ground contour which affect the tractor wheels, thereby providing increased comfort for the driver of the vehicle.

In accordance with the invention the forward pivot connection of the axle assembly which, with the rear pivot connection, defines the roll axis, is connected to the tractor substantially midway of the drive shaft, and at a position above the drive shaft, so that universal joints at each end of the drive shaft are subjected to only one half of the vertical angular movement of the axle assembly as the wheels move upwardly and downwardly with respect to the tractor.

The fact that the driven tractor wheels may undergo relative rolling movement with respect to the tractor insures that both of the wheels will remain in positive traction or driving engagement with the ground regardless of the variations in ground contour and regardless of the nature and construction of the trailing section of the vehicle.

In short, it is an object of the invention to provide a power train and suspension for an off-highway vehicle which is mechanically efficient, which permits the universal joints of the drive train to rock through as little as one half of the angle required by previous constructions, and which insures positive traction and operator comfort even on the roughest terrain.

Other objects and advantages of the invention will become apparent upon reading the attached detailed description and upon reference to the drawings.

DETAILED DESCRIPTION OF THE PREFERRED EMBODIMENT

Figure 1:
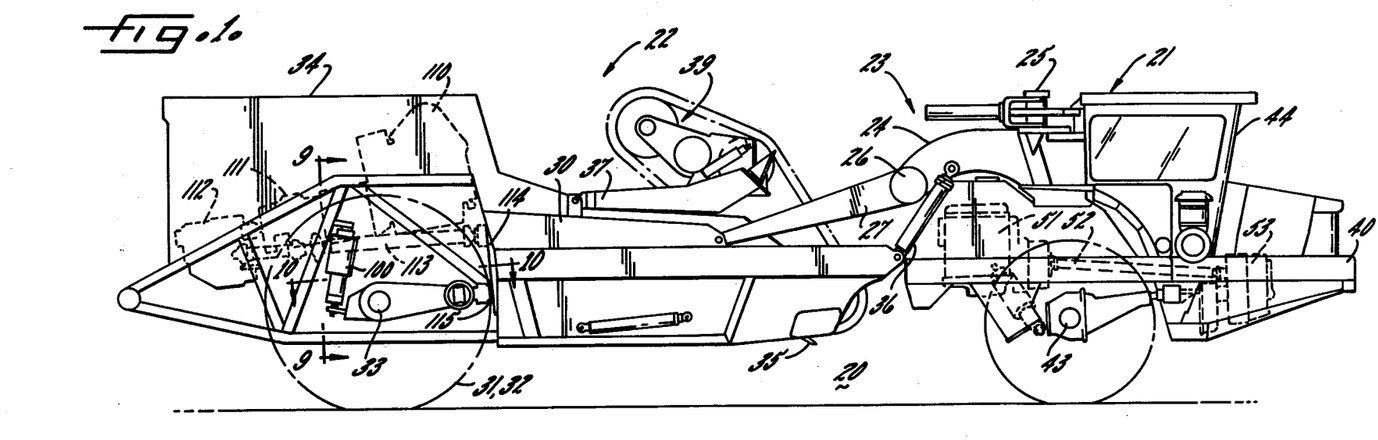
FIG. 1 is a general side elevation of an off-highway vehicle in the form of a tractor drawn scraper assembly including the features of the present invention.
Figure 2:
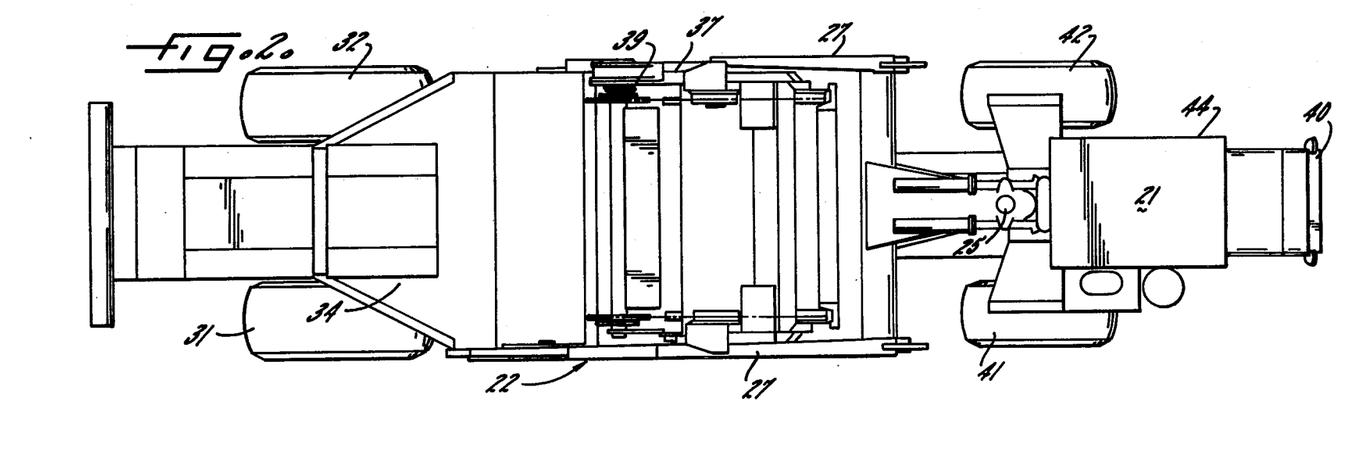
FIG. 2 is a plan view of the scraper assembly of FIG. 1.

Referring now to the drawings there is disclosed in FIGS. 1 and 2 an off-highway vehicle in the form of a tractor drawn scraper 20 having a tractor assembly 21 and bowl assembly 22, the two assemblies being interconnected by a draft frame 23 providing rolling rigidity between the bowl and tractor. The draft frame includes a so-called gooseneck 24 which is of rigid construction pivoted to the tractor assembly 25 for horizontal swinging (steering) movement and carrying a yoke tube 26, to the lateral ends of which are rigidly secured draft members 27, one on each side of the bowl.

The bowl, indicated at 30, has wheels 31, 32 on an axle 33. In the region between, and largely above, the wheels there is a drive housing 34 containing an engine and drive train and to which reference will later be made. At the front of the bowl 30 is a transversely extending digger blade 35. A pair of bowl actuators 36 are connected between the front end of the bowl and the gooseneck 24, the actuators being capable, upon elongation, of rocking the trailing section 22 downwardly about its supporting wheels so that the blade 35 is in scraping engagement with the ground. The earth which is loosened by the blade is elevated and deposited at the rear of the bowl by means of a power driven elevator 39 which is supported upon a pair of arms 37.

Turning attention to the tractor assembly 21, it includes a frame 40 supported upon a pair of ground engaging wheels 41, 42 on an axle 43. The frame carries a cab 44. The wheels 41, 42 are driven by a drive train 50 which includes an engine 51 at the rear of the tractor section, an intermediate drive shaft 52, a transmission 53 which is located at the front of the tractor and which has a clutch housing 54 secured to its rear surface.

Figure 3:
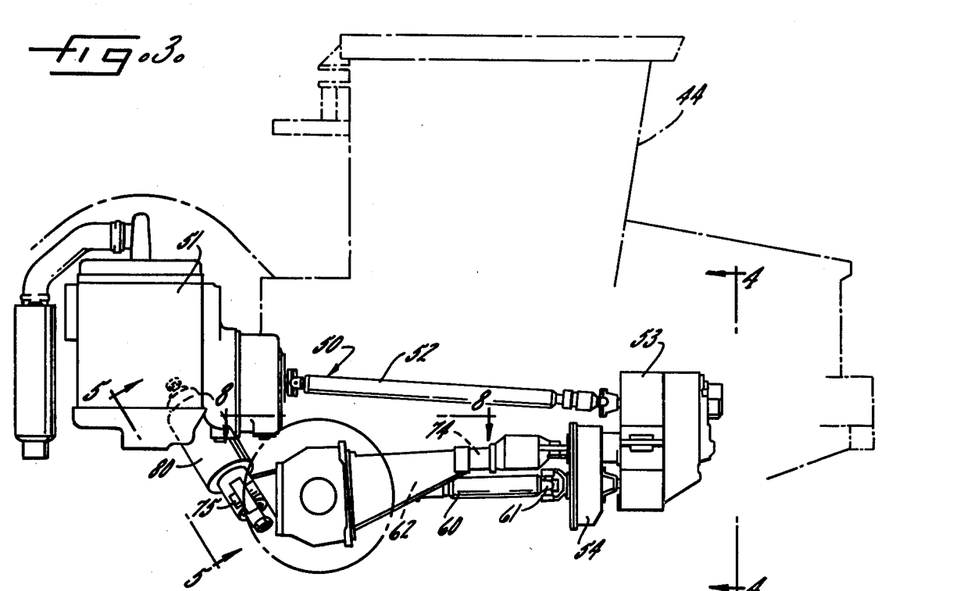
FIG. 3 is an elevational view similar to FIG. 1 but restricted to the elements of the tractor drive train.

Leading rearwardly from the clutch housing is a main drive shaft 60 having a first universal joint 61 and a second universal joint 62, the second universal joint being coupled to the wheels 41, 42. The drive shaft has a central telescoping spline connection 63.

In accordance with the present invention the traction section has an axle assembly which includes an axle housing having a forwardly projecting tongue and aligned front and rear pivot connections defining a roll axis, with the front pivot connection being connected to the tractor frame at a point which is above the main drive shaft and at a position which is substantially midway between the universal joints of the drive shaft for minimizing and equalizing the rocking motion, or articulation, at the joints upon a given amount of relative vertical movement of the tractor axle housing, the main drive shaft being formed in two sections which are telescoped and splined together to accommodate a variation in spacing between the universal joints which occurs upon vertical movement of the wheels.

Figures 8, 9, 10:
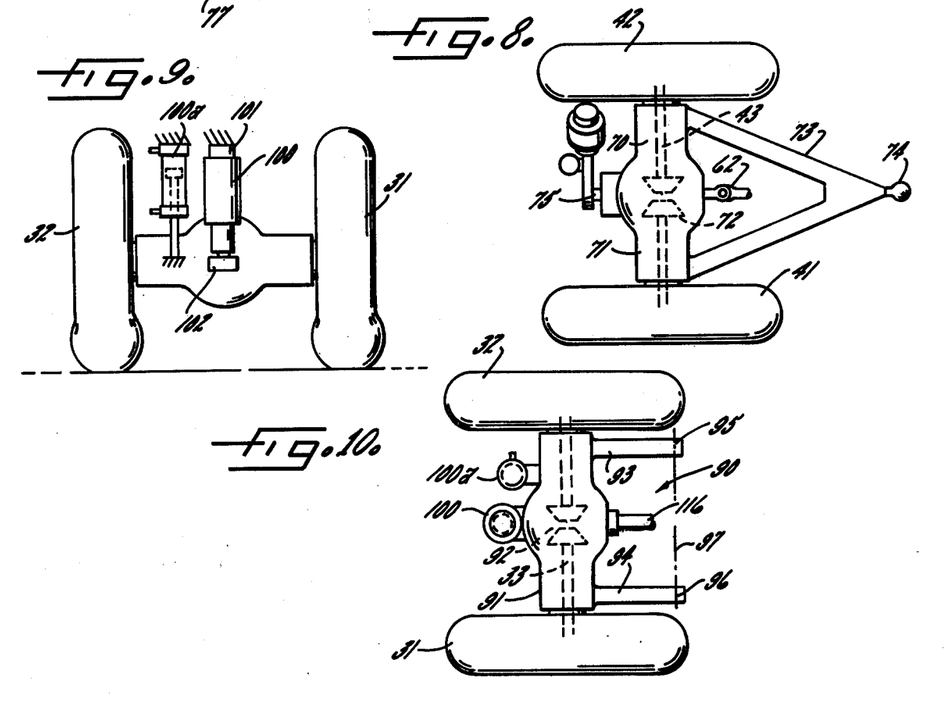
FIG. 8 is a plan view of the tractor axle assembly looking along line 8—8 in FIG. 3.
FIG. 9 is a rear elevational view of the suspension for the trailing section of the vehicle looking along line 9—9 in FIG. 1.
FIG. 10 is a plan view of the trailing section axle assembly looking along line 10—10 in FIG. 1.
Figure 11:
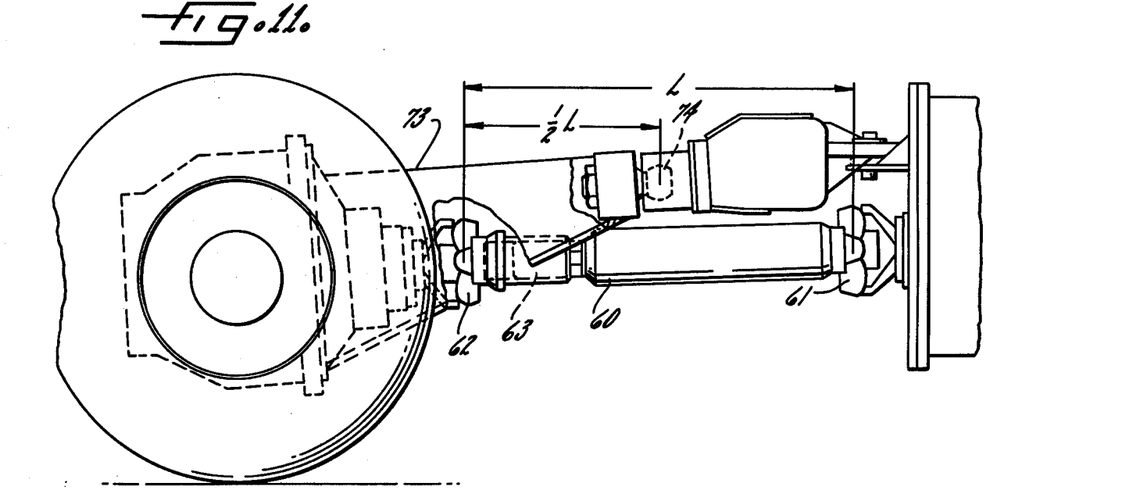
FIG. 11 is a elevational view, in partial section, showing the tractor section axle assembly on an enlarged scale.

Thus, referring to FIG. 8, there is provided a tractor axle assembly 70 having an axle housing 71 which supports the axle 43 and which is enlarged at its center to accommodate a differential mechanism 72 which may be conventionally constructed, the input of the differential mechanism being directly coupled to the rear universal joint 62. Rigidly secured to the axle housing and projecting forwardly thereof in a centered position is a tongue 73 having a pivot connection with the tractor frame 40 in the form of a ball and socket connection 74. The tongue 73, it will be noted, is divergent, or V-shaped, and extends downwardly at a slight angle, as well as rearwardly, so as to straddle the drive shaft 60 and the universal joint which is at the rear end of the drive shaft. Located to the rear of the axle housing 71 in centered position is a second pivot connection 75, the two pivot connections defining a roll axis 76 providing relative tilting movement of the axle assembly with respect to the tractor frame. The roll axis 76 extends rearwardly and downwardly, along the center of the vehicle, at such an angle as to intersect the ground at a point 77 midway between the wheels 31, 32 of the trailing section.

Figures 4, 5:
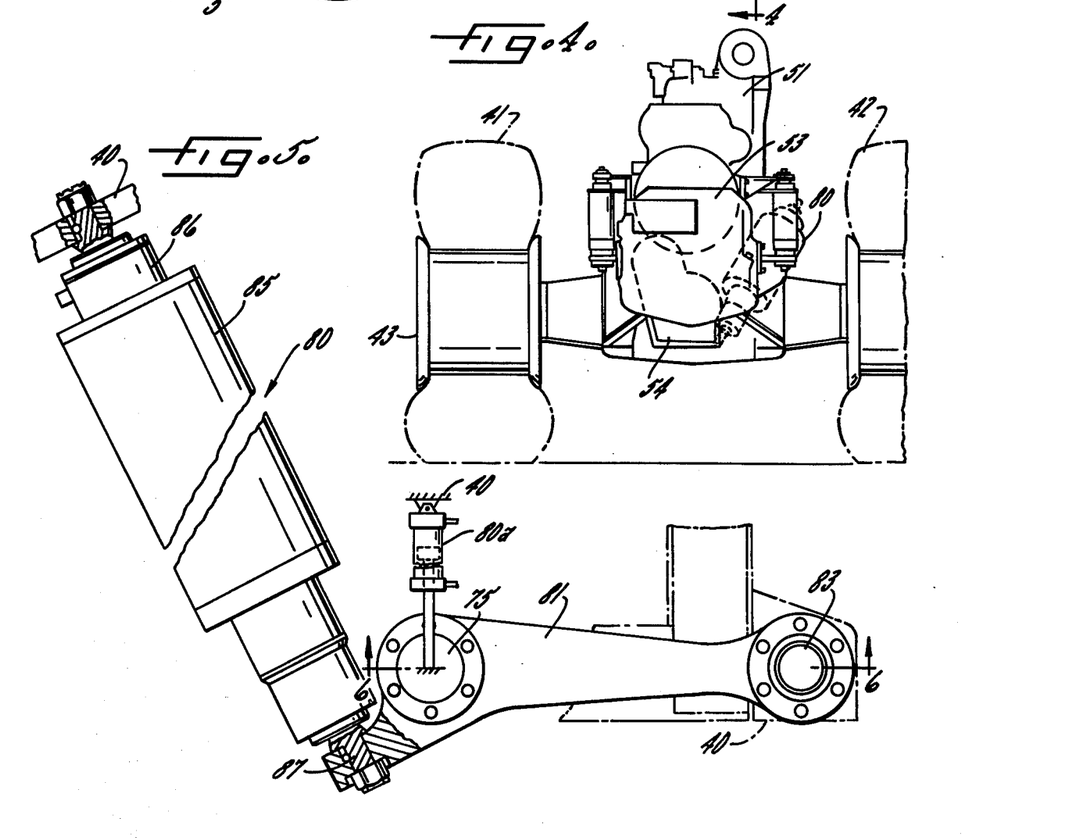
FIG. 4 is a front elevational view of the drive train looking along the line 4—4 in FIG. 3.
FIG. 5 is a fragmentary view showing the spring suspension device for the axle assembly looking along line 5—5 in FIG. 3.
Figure 6:
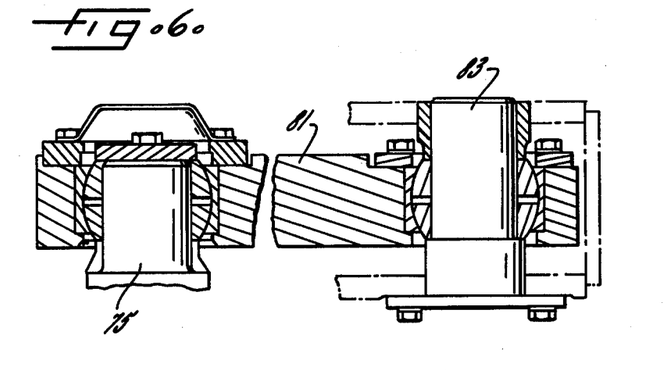
FIG. 6 is a fragmentary sectional view taken through the linkage along line 6—6 in FIG. 5.
Figure 7:
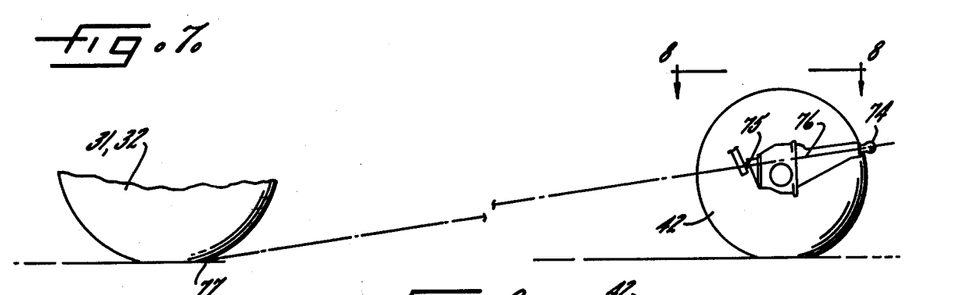
FIG. 7 is a diagram illustrating the orientation of the roll axis of the tractor axle assembly.

In carrying out the present invention a spring suspension device 80 (see especially FIG. 5) is interposed between the tractor frame 40 and the rear pivot connection 75 on the axle assembly. The suspension assembly includes a panhard type link having a horizontal arm 81 and a downwardly angled arm 82. The horizontal arm 81 extends from the pivot connection 75 on the axle housing to a pivot connection 83 along one side of the tractor frame 40. Interposed between the angled arm 82 of the panhard link and the tractor frame 40 is a spring in the form of an air/oil suspension device 85 having an upper connection 86 and a lower connection 87. The horizontal arm portion 81 of the panhard link serves as a radius rod to keep the axle housing 70 constantly centered with respect to the tractor while accommodating vertical movement of the axle assembly as well as rolling movement about the roll axis 76. In accordance with one of the features of the present invention, the axis of the pivot connections 75, 83 and the body of the spring suspension device 85 are all angled rearwardly and downwardly as illustrated, in part, in FIG. 3.

The effect of the geometry as described will be apparent upon reference to the stop motion views 12b, 12c which illustrate the striking of a bump and striking of a hole, respectively, as well as the diagrams 13b, 13c which correspond thereto but in which the angle of rocking has been doubled for the sake of emphasis.

Figure 13A:
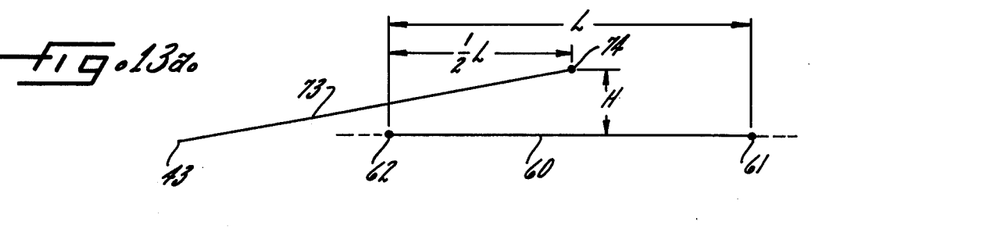
FIGS. 13a–13c are geometric constructions corresponding to FIGS. 12a–12c and showing the substantial reduction in rocking motion at the universal joints resulting from the present invention.
Figure 13B:
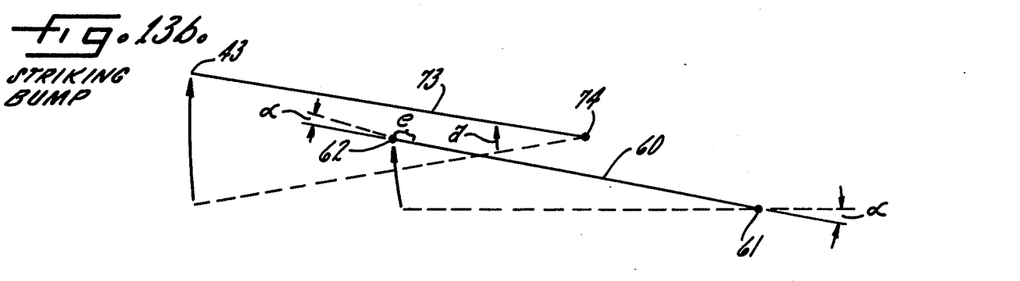

Thus when the rear axle 43 moves upwardly through an angle $a$ from the position shown in FIG. 13a to the position shown in FIG. 13b, the motion is accompanied by movement of the rear universal joint to the elevated position 62 in FIG. 13b, rocking the drive shaft 60 into the position shown in the latter figure. This movement of the drive shaft 60 is accompanied by relative rocking or articulation between the input and output elements of the universal joints as indicated by the angle $\alpha$ is not only equal at the two universal joints but it is substantially less than the rocking angle $a$ of the tongue 73.

The movement of the tongue and drive shaft upwardly, upon striking a bump, is accompanied by elongation of the drive shaft in the amount $e$ illustrated in FIG. 13b, such elongation being accompanied by extending movement at the splined telescoping connection 63 between the front and rear sections of the drive shaft.

Figure 12A:
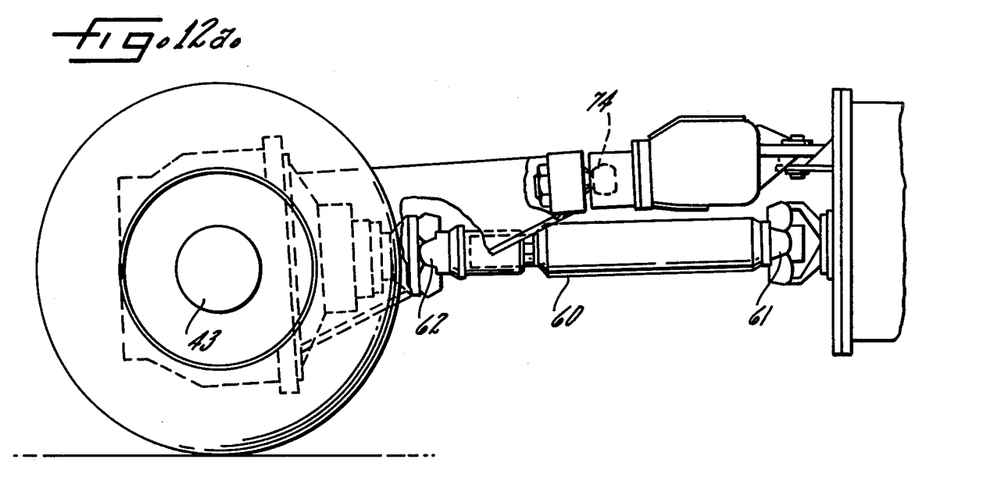
FIGS. 12a–12c are stop motion views showing the tractor axle assembly in its neutral condition, upon striking a bump, and upon striking a hole respectively.
Figure 12B:
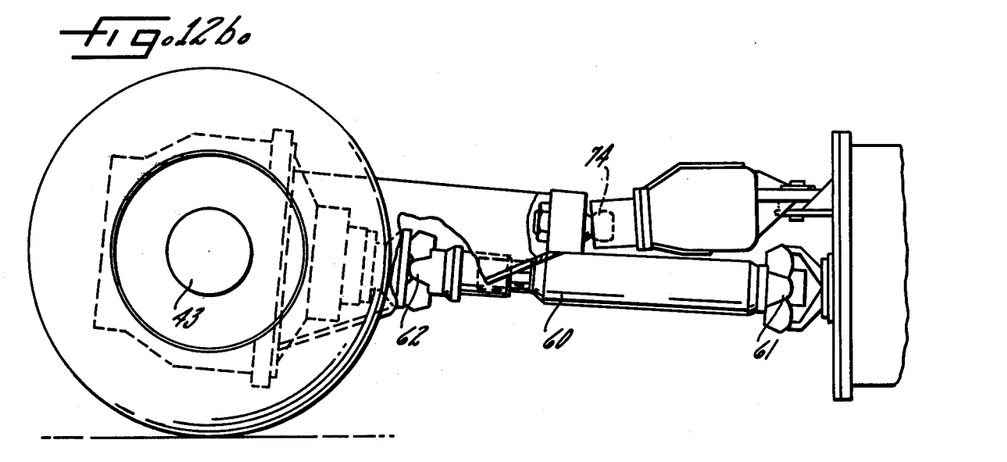
Figure 12C:
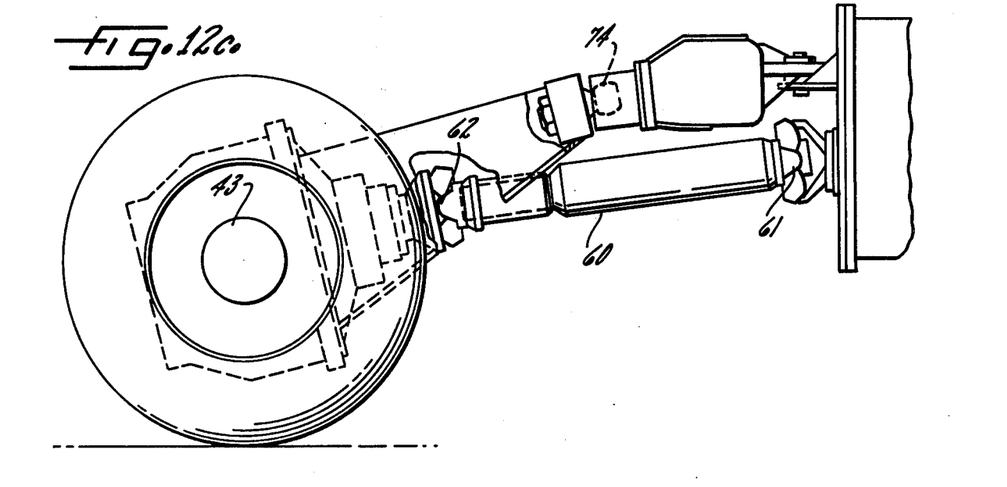
Figure 13C:
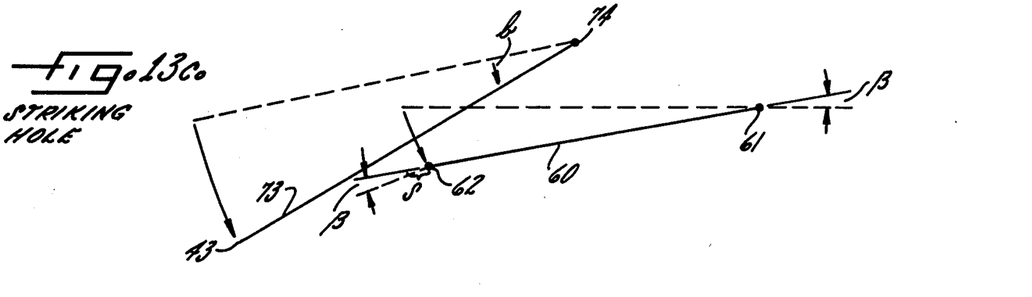

An analogous effect occurs upon striking a hole, which is the condition illustrated in FIGS. 12c, 13c. As the wheels move down into the hole the tongue 73 moves from its neutral position illustrated in FIG. 13a to its downwardly-swung position illustrated in FIG. 13c, accompanied by downward movement of the universal joint 62 and drive shaft 60. Where the tongue swings downwardly through an angle $b$, as illustrated, articulation occurs to a miminum, and equal, degree to both of the universal joints 61, 62 as indicated at $\beta$ in FIG. 13c. The downward movement of the drive shaft is accompanied by shortening of the drive shaft in the amount $s$, with such change in length again being accommodated by a splined connection 63 in the drive shaft.

As a result of the geometry of the present invention large amounts of relative vertical movement of the tractor wheels 41, 42 with respect to the tractor frame can be accommodated with only slight, and equalized, articulation at the universal joints. The reduction in the degree of rocking at the universal joints in the drive train is of importance since it minimizes a resulting torsional acceleration and deceleration between the connected shafts, which accelerations and decelerations create torsional disturbances and additional forces that can drastically reduce the life of the power train.

While the described upward and downward movement of the axle assembly upon striking a bump or hole has assumed upward and downward movement of the wheels in unison, it will be understood that it is one of the features of the present construction that the axle assembly 70 is free to oscillate about the fore-and-aft extending roll axis 76 with the same "equal angle" benefits. Indeed, where only one of the tractor wheels strikes a bump or a hole, the size of the bump or hole may be doubled while producing the same geometry as set forth in FIGS. 13b, 13c, since such figures are premised upon the average position of the two wheels.

The features and advantages of the tractor are realized to the fullest degree when the tractor section is coupled to a trailing section supported by wheels which are non-rolling about a fore-and-aft axis, that is to say, wheels which have rolling rigidity with respect to a fore-and-aft axis. Consequently referring again to FIGS. 1 and 2, and also to FIGS. 9 and 10, the wheels 31, 32 of the trailing section, or bowl, and their axle 33, are supported upon a trailer axle assembly 90 having an axle housing 91 which is enlarged at center to accommmodate a differential 92. Extending forwardly from the axle housing, and rigidly secured to it are a pair of laterally spaced tongues 93, 94 which are connected to the bowl structure at laterally spaced pivot connections 95, 96 providing up and down swinging movement of the axle assembly about a transversely extending axis 97. For springing of the wheels of the trailing section a spring suspension device 100 (FIG. 9) is provided having an upper connection 101 with the bowl structure and a lower connection 102 with the axle housing 91. The wheels 31, 32 are thus free to swing upwardly and downwardly in unison with one another, with the motion cushioned by the spring suspension device 100. In carrying out the present invention a separate drive train is provided for driving the wheels of the trailing section. Such rear or "bowl" drive train includes an engine 110 at the rear end of the trailing section having an hydraulic coupling 111 to a transfer box 112. Projecting forwardly from the latter is an intermediate drive shaft 113 which feeds a second transfer box 114 having an output 115 coupled to a rearwardly extending drive shaft 116 which drives the differential 92 previously referred to. Either of the transfer boxes 112 104 may be in the form of a transmission having change gearing. Because of the large amount of weight generally carried by the bowl, both of the wheels 31, 32 are constantly pressed into gripping engagement with the ground to provide a constant high degree of traction.

Since the laterally spaced tongues 93, 94 of the trailer axle assembly preclude relative rolling movement of the trailer wheels about a fore-and-aft axis, the wheels are constrained to bear a constant "roll" relationship to the bowl thereby determining the lateral tilt relationship of the scraper blade 35 with respect to the ground. Also because of the combined rolling rigidity between the trailer wheels 31, 32 and the bowl and the rolling rigidity between the bowl and the tractor, due to the nature of the draft hitch 23, the tractor is positioned about its roll axis 76, that is to say, is positioned as to lateral tilting, in accordance with the position of the bowl. Since the bowl, particularly when filled, is weighty and relatively ponderous, it tends to resist lateral tilting or swaying movement so that the tilting movement which is imparted to the tractor, and hence to the cab of the tractor, is minimized. Stated in other words, because of the particular power train and suspension which has just been described, the cab remains relatively stable, subjecting the operator to a minimum of lateral accelerational forces while the tractor wheels are, at the same time, free to follow variations in ground contour at an unopposed and relatively rapid rate.

The contruction described above provides separate springing for the two portions of the vehicle, with the spring suspension devices 80, 100 servicing the tractor and bowl (or trailer) respectively. In carrying out the invention the suspension devices are preferably by-passed by hydraulic actuators 80a, 100a as shown, respectively, in FIGS. 5 and 9 to give the operation the option of rigidifying the suspension for the taking of a more precise cut. The actuators 80a, '100a, when used, are anchored to the frame of tractor and bowl respectively, and so arranged as to pull upwardly on the respective axle housings upon application of high pressure fluid compressing the associated suspension devices until bottoming occurs. This defeats the springing just as though the suspension devices were rigid between their points of connection in their retracted condition. When it is desired to restore the springing, for example, for transport, the pressure on the actuators 80a, 100a, is simply released so that the actuators thereafter floatingly follow the motions of the suspensions. Application and release are under the control of separate valves V (FIGS. 5 and 8) so that the spring suspension devices may be rigidified either individually or jointly.

The term "transmission" employed herein is used in the general sense to cover a power transmission device either with or without change gearing. The term "engine" refers generally to a source of driving power, even an electric motor. The term "draft frame" includes any interconnecting frame structure between the front and rear portions of the device.

What is claimed is:

1. An off-highway vehicle comprising, in combination, a tractor section and a trailing section, the trailing section having a pair of ground-engaging wheels, the tractor section having a pair of ground-engaging wheels, a draft frame providing rolling rigidity interposed between the sections, the tractor section having an axle assembly including a tractor axle as well as an axle housing and a forwardly projecting tongue rigidly secured thereto, the tractor section having an engine coupled to the respective pair of ground-engaging wheels, the tractor engine being mounted at the rear of the tractor section, a transmission at the front of the tractor section having its input coupled to the engine, a drive shaft extending rearwardly from the transmission and coupled to the tractor axle, the tractor axle assembly having alined front and rear pivot connections defining an axle roll axis, the front pivot connection being connected to the tractor section, a spring suspension device interposed between the rear pivot connection and the tractor section to accommodate vertical and rolling movement of the tractor axle housing as the machine passes over irregular ground, the drive shaft having universal joints at its ends, the forward pivot connection of the axle assembly being positioned substantially midway of the universal joints for substantially equal angular deflection at the joints upon a given amount of relative vertical movement of the tractor axle housing.

2. The combination as claimed in claim 1 in which the front pivot connection of the tractor axle assembly is located above the level of the universal joints and in which the drive shaft between the universal joints has a telescoping splined connection to accommodate changes in the spacing of the universal joints occurring as a result of vertical movement of the tractor axle assembly.

3. An off-highway vehicle comprising, in combination, a tractor section and a trailing section, the trailing section having a pair of ground-engaging wheels, the tractor section having a pair of ground-engaging wheels, a draft frame providing rolling rigidity interposed between the sections, the tractor section having an axle assembly including a tractor axle as well as an axle housing and a forwardly projecting tongue rigidly secured thereto, the tractor and trailing sections each having an engine at the rear and thereof coupled to the respective pair of ground-engaging wheels, a transmission at the front of the tractor section having its input coupled to the engine, a drive shaft extending rearwardly from the transmission and coupled to the tractor axle, the tractor axle assembly having alined front and rear pivot connections defining an axle roll axis, the front pivot connection being connected to the tractor section, a spring suspension device interposed between the rear pivot connection and the tractor section to accommodate vertical and rolling movement of the tractor axle housing as the machine passes over irregular ground, the drive shaft having universal joints at its ends, the forward pivot connection of the axle assembly being positioned substantially midway of the universal joints for substantially equal angular deflection at the joints upon a given amount of relative vertical movement of the tractor axle housing.

4. An earthmoving machine comprising, in combination, a scraper bowl having a frame and scraper blade, the frame being supported on a pair of ground-engaging wheels, a tractor having a frame and pair of ground-engaging wheels, a draft frame interposed between the scraper bowl and tractor including a vertically hinged gooseneck having rigidly secured thereto a pair of rearwardly extending draft links, the latter being pivoted at their rear ends to the sides of the bowl, a bowl actuator interposed between the draft frame and the bowl to determine the scraping depth of the blade, a tractor axle assembly including an axle as well as an axle housing and a forwardly projecting tongue rigidly secured thereto, the tractor and scraper bowl each having an engine coupled to the associated ground-engaging wheels, the tractor engine being mounted at the rear of the tractor frame, a transmission at the front of the tractor frame having its input coupled to the engine, a drive shaft extending rearwardly from the transmission and coupled to the tractor axle, the tractor axle assembly having alined front and rear pivot connections defining an axle roll axis, the front pivot connection being coupled to the frame, a transversely extending panhard type link interposed between the rear pivot connection and the frame so that the link retains the axle assembly for moving laterally while accommodating vertical and rolling movement of the assembly as the machine passes over irregular ground, a spring suspension device interposed between the axle assembly and the tractor frame, the drive shaft having universal joints at its ends, the forward pivot connection of the axle assembly being positioned substantially midway of the universal joints for substantially equal angular deflection at the joints upon a given amount of relative vertical movement of the tractor axle assembly.

5. An off-highway vehicle comprising, in combination, a tractor section and a trailing section the trailing section having a pair of ground-engaging wheels, the tractor section having a pair of ground-engaging wheels, a draft frame interposed between the sections, the sections each having an engine at the rear thereof coupled to the respective pair of ground-engaging wheels, the tractor section having an axle assembly including an axle together with an axle housing and a forwardly projecting tongue rigidly secured thereto in a centered position, the tractor axle assembly having front and rear axially alined pivot connections defining an axle roll axis, the front pivot connection being connected to the tractor section, a first spring suspension device interposed between the rear pivot connection and the tractor section to accommodate vertical and rolling movement of the assembly as the tractor section passes over irregular ground, a trailing section axle assembly including an axle together with an axle housing and a pair of laterally spaced forwardly projecting tongues rigidly secured thereto, the trailing section axle assembly having transversely alined pivot connections connected to the trailer section at the forward ends of the tongues, a second spring suspension device interposed between the trailing section axle assembly and the trailing section, the draft frame being so constructed as to provide rolling rigidity between the sections so that the degree of lateral tilting of the tractor section relative to the ground is determined by the tilt of the trailing section while the tractor section axle assembly is free to undergo relative movement about its roll axis in the following of ground contours.

6. The invention as claimed in claim 5 in which means are provided for rigidly by-passing at least one of the spring suspension devices together with means for shifting the by-passing means between an operative and inoperative condition.

7. An earth moving machine comprising, in combination, a scraper bowl having a frame and having a scraper blade along the front edge thereof, the frame being supported by a pair of ground-engaging wheels, a tractor having a frame and supported by a pair of ground-engaging wheels, a draft frame interposed between the scraper bowl and tractor including a gooseneck vertically hinged to the tractor and having rigidly secured thereto a pair of rearwardly extending draft links pivoted at their rear ends to the sides of the bowl, a bowl actuator interposed between the draft frame and the front of the bowl to determine the scraping depth of the blade, the tractor and scraper bowl each having an engine at the rear thereof coupled to the respective pair of ground-engaging wheels, a tractor axle assembly including an axle together with an axle housing and a forwardly projecting tongue rigidly secured thereto in a centered position, the tractor axle assembly having front and rear axially alined pivot connections defining an axle roll axis, the front pivot connection being coupled to the tractor frame so that the link restrains the axle assembly from moving laterally, a tractor spring suspension device interposed between the tractor axle assembly and the tractor frame for accommodating vertical and rolling movement of the assembly as the tractor passes over irregular ground, a bowl axle assembly including an axle together with an axle housing and a pair of spaced forwardly projecting tongues rigidly secured thereto, the bowl axle assembly having transversely alined pivot connections at the forward ends of the tongues, a bowl spring suspension device interposed between the bowl axle assembly and the frame of the bowl, the vertical hinge connection between the scraper bowl and the tractor providing rolling rigidity between them so that the degree of lateral tilting of the tractor relative to the ground is determined by the tilt of the bowl, while the tractor axle assembly is free to undergo relative movement about its roll axis in the following of ground contours.

8. The combination as claimed in claim 7 in which means are provided for rigidly by-passing at least one of the suspension devices to insure more constant depth of cut of the scraper blade together with means for shifting the by-passing means between an operative and inoperative condition.

9. An earth moving machine comprising, in combination, a scraper bowl having a frame and having a scraper blade along the front edge thereof, the frame being supported by a pair of ground-engaging wheels, a tractor having a frame and supported by a pair of ground-engaging wheels, a draft frame interposed between the scraper bowl and tractor including a gooseneck vertically hinged to the tractor and having rigidly secured thereto a pair of rearwardly extending draft links pivoted at their rear ends to the sides of the bowl, a bowl actuator interposed between the draft frame and the front of the bowl to determine the scraping depth of the blade, the tractor and scraper bowl each having an engine, a tractor axle assembly including an axle together with an axle housing and a forwardly projecting tongue rigidly secured thereto in a centered position, the tractor axle assembly having front and rear axially alined pivot connections defining an axle roll axis, the front pivot connection being coupled to the tractor frame, a transversely extending panhard type link interposed between the rear pivot connection and the tractor frame so that the link restrains the axle assembly from moving laterally while accommodating vertical and rolling movement of the assembly as the tractor passes over irregular ground, a tractor spring suspension device interposed between the axle assembly and the tractor frame, a bowl axle assembly including an axle together with an axle housing and a pair of spaced forwardly projecting tongues rigidly secured thereto, the bowl axle assembly having transversely alined pivot connections at the forward ends of the tongues, a bowl spring suspension device interposed between the bowl axle assembly and the frame of the bowl, the vertical hinge connection between the scraper bowl and the tractor providing rolling rigidity between them so that the degree of lateral tilting of the tractor relative to the ground is determined by the tilt of the bowl, while the tractor axle assembly is free to undergo relative movement about its roll axis in the following of ground contours.

10. An off-highway vehicle comprising, in combination, a tractor section and a trailing section, the trailing section having a pair of ground-engaging wheels, the tractor section having a pair of ground-engaging wheels, a draft frame providing rolling rigidity interposed between the sections, the tractor section having an axle assembly including a tractor axle as well as an axle housing and a forwardly projecting tongue rigidly secured thereto, the tractor section having an engine coupled to the respective pair of ground-engaging wheels, a transmission at the front of the tractor section having its input coupled to the engine, a drive shaft extending rearwardly from the transmission and coupled to the tractor axle, the tractor axle assembly having alined front and rear pivot connections defining an axle roll axis, the front pivot connection being connected to the tractor section, a spring suspension device interposed between the rear pivot connection and the tractor section to accommodate vertical and rolling movement of the tractor axle housing as the machine passes over irregular ground, the drive shaft having universal joints at its ends, the forward pivot connection of the axle assembly being positioned substantially midway of the universal joints for substantially equal angular deflection at the joints upon a given amount of relative vertical movement of the tractor axle housing, the spring suspension device having associated linkage for maintaining the rear pivot connection substantially centered with respect to the tractor section in the face of relative vertical and rolling movement of the tractor axle housing.

* * * * *